(12) United States Patent
Dashfield et al.

(10) Patent No.: US 12,184,634 B2
(45) Date of Patent: Dec. 31, 2024

(54) METHOD FOR PROVISION OF ACCESS GRANT

(71) Applicant: JPMorgan Chase Bank, N.A., New York, NY (US)

(72) Inventors: Carl Dashfield, Columbus, OH (US); Michael D Ackerman, Armonk, NY (US); Michael George Norman, Edinburgh (GB); Kabron Austin Kline, Grove City, OH (US); Isaac Leonardo Blum, Armonk, NY (US); Afzaal Syed, Raritan, NJ (US); Douglas J Symalla, Frisco, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 345 days.

(21) Appl. No.: 17/444,413

(22) Filed: Aug. 4, 2021

(65) Prior Publication Data

US 2022/0046004 A1   Feb. 10, 2022

Related U.S. Application Data

(60) Provisional application No. 63/061,378, filed on Aug. 5, 2020.

(51) Int. Cl.
*H04L 9/40* (2022.01)
*H04L 9/32* (2006.01)

(52) U.S. Cl.
CPC ........ *H04L 63/0815* (2013.01); *H04L 9/3213* (2013.01); *H04L 63/0807* (2013.01);
(Continued)

(58) Field of Classification Search
CPC .............. H04L 63/0815; H04L 9/3213; H04L 63/0807; H04L 63/102; H04L 63/104; H04L 63/105
See application file for complete search history.

(56) References Cited

U.S. PATENT DOCUMENTS

| 11,089,028 B1 * | 8/2021 | Alpaugh ............... H04L 63/104 |
| 2009/0209350 A1 * | 8/2009 | Kelly .................. G07F 17/3248 463/42 |

(Continued)

OTHER PUBLICATIONS

Fernández, Federico; Alonso, Álvaro; Marco, Lourdes; Salvachúa, Joaquin; "A model to enable application-scoped access control as a service for IoT using OAuth 2.0," 20th Conference on Innovations in Clouds, Internet and Networks (ICIN), Paris, France, 2017, pp. 322-324.*

*Primary Examiner* — Victor Lesniewski
(74) *Attorney, Agent, or Firm* — Greenblum & Bernstein, P.L.C.

(57) ABSTRACT

A method for validating an access request with respect to an application is provided. The method includes: receiving an access request from a user with respect to an application; retrieving, from a memory, group identification information that relates to at least one group to which the user belongs; retrieving, from the memory, scope information that indicates qualifications and/or characteristics of a relationship between the user and the at least one group; and generating a token that notifies the application of the group identification information and the scope information, and is usable by the application for validating the access request. The method may be implemented in an Active Directory Federation Services (AD FS) environment.

19 Claims, 5 Drawing Sheets

(52) U.S. Cl.
CPC .......... *H04L 63/102* (2013.01); *H04L 63/104* (2013.01); *H04L 63/105* (2013.01)

(56) References Cited

U.S. PATENT DOCUMENTS

| | | | | |
|---|---|---|---|---|
| 2012/0254957 | A1* | 10/2012 | Fork | G06F 21/33 |
| | | | | 726/6 |
| 2014/0068743 | A1* | 3/2014 | Marcus | H04L 63/0815 |
| | | | | 726/8 |
| 2017/0331832 | A1* | 11/2017 | Lander | H04L 63/102 |
| 2018/0083915 | A1* | 3/2018 | Medam | G06F 16/2246 |
| 2018/0295135 | A1* | 10/2018 | Feijoo | H04L 63/083 |
| 2019/0095516 | A1* | 3/2019 | Srinivasan | H04L 63/102 |
| 2019/0253430 | A1* | 8/2019 | Gamache | G06F 21/41 |
| 2019/0319946 | A1* | 10/2019 | Fan | H04L 9/3213 |
| 2019/0394204 | A1* | 12/2019 | Bansal | H04L 63/0815 |
| 2020/0021574 | A1* | 1/2020 | Pinner | H04L 63/102 |
| 2020/0162454 | A1* | 5/2020 | Jain | H04L 63/0815 |
| 2020/0374121 | A1* | 11/2020 | Momchilov | H04L 9/0825 |
| 2021/0081252 | A1* | 3/2021 | Bhargava | G06F 9/5072 |
| 2021/0084031 | A1* | 3/2021 | Lao | H04W 12/06 |
| 2021/0377276 | A1* | 12/2021 | Dasari | H04L 63/0853 |
| 2022/0021677 | A1* | 1/2022 | Lee | H04L 67/133 |

* cited by examiner

METHOD FOR PROVISION OF ACCESS GRANT

CROSS-REFERENCE TO RELATED APPLICATIONS

This application claims the benefit of U.S. Provisional Patent Application Ser. No. 63/061,378, filed Aug. 5, 2020, which is hereby incorporated by reference in its entirety.

BACKGROUND

1. Field of the Disclosure

This technology generally relates to methods and systems for provision of access to an application, and more particularly, to methods and systems for efficiently validating an application access request and generating an access token while handling large volumes of requests and ensuring accuracy and security with respect to the application.

2. Background Information

In a claims-based authorization model, each request that is made by a user to an application is accompanied by a token that can be used by the application to establish its relationship with the user, as well as other user attributes. The token is signed and encoded, but when decoded, the token includes a simple payload of a JavaScript Object Notation (JSON) or Extensible Markup Language (XML) object containing strings or a list of strings. Each field includes a name-value pair and is referred to a claim. In this context, the application may be referred to as a Relying Party.

In a conventional implementation of Active Directory Federation Services (AD FS), an Active Directory (AD) Object known as a Distribution Group may be used to represent a Resource Function (or application Role). AD Objects such as Group and User have a single attribute known as a Common Name (CN) whose length is bounded at 64 double-byte characters. The CN of an Object is unique among the sibling objects in the container that contains the Object, and forms the left-most part of a Distinguished Name (DN) which uniquely identifies the object.

A Resource Function Assignment indicates the fact that a particular user has been assigned a particular Role in a particular application. To store Resource Function Assignments, a Distribution Group having a CN that is set to a combination of the unique identifier of the Relying Party and the name of the Resource Function is used. For example, a Group may have a CN of "Reader-88663-12715-prod". Assignment of the Resource Function to the User is recorded by making the User a member of the Group. The name of the Group becomes the value that appears in a Roles claim issued by AD FS.

The membership of the Group is recorded as an attribute on the User called memberOf and an attribute on the Group called member, and these attributes are linked from Group to User. Both attributes contain multiple values of a commonly-used attribute type in Active Directory known as an Object(DS-DN), which contains the fully-qualified name (DN) of the linked object, and when read from either side, the names of the linked objects on the other side can be easily identified.

In order to prepare a token for a User for a Relying Party, AD FS performs several functions. First, the group names linked to the User as Distinguished Names (DNs) are retrieved from AD. Second, the name of each group is split in order to find a Common Name (CN), which contains the identity of the Relying Party and the name of the corresponding Resource Function Assignment. Third, the Resource Function names for which the identifier of the Relying Party in the Group CN matches the identifier of the Relying Party for which the token has been requested is written into the token.

This token preparation process is extremely fast, as the process simply involves a single call to AD to retrieve the User and all of its Group Memberships, followed by a relatively small amount of string processing, then writing the string to the claim.

SUMMARY

The present disclosure, through one or more of its various aspects, embodiments, and/or specific features or sub-components, provides, inter alia, various systems, servers, devices, methods, media, programs, and platforms for efficiently validating an application access request and generating an access token while handling large volumes of requests and ensuring accuracy and security with respect to the application.

According to an aspect of the present disclosure, a method for validating an access request with respect to an application is provided. The method is implemented by at least one processor. The method includes: receiving, from a user, an access request with respect to an application; retrieving, by the at least one processor from a memory, group identification information that relates to at least one group to which the user belongs; retrieving, by the at least one processor from the memory, scope information that relates to at least one characteristic of a relationship between the user and the at least one group; generating, by the at least one processor, a token that includes a first indicator that relates to the group identification information and at least a second indicator that relates to the scope information, the token being usable to validate the access request; and transmitting, to the application, the token in order to facilitate a validation of the access request.

The at least one processor may include a processor that is hosted on an Active Directory Federation Services (AD FS) server. The memory may include an Active Directory (AD) memory.

The retrieving of the group identification information may include retrieving an object having a name that corresponds to a unique identifier of a relying party thereof.

The group identification information may include information that relates to at least one from among a job title and a job function of the user.

The retrieving of the scope information may include retrieving a link between the relying party and the user. The link may be created in a direction from the user to the relying party.

The scope information may include information that relates to at least one from among a product restriction, a geographical restriction, and an authorization level restriction.

The generating of the token may include retrieving information that identifies the user in conjunction with all existing links between the relying party and the user.

The generating of the token may further include extracting, from at least one of the existing links between the relying party and the user, at least one string for which a name of an object that corresponds to the at least one of the existing links matches with the unique identifier of the relying party.

When the application includes a trading application that is usable for executing trades of security instruments, the scope information may include information that relates to at least one restriction for a trade to be executed by the user.

According to another exemplary embodiment, a computing apparatus for validating an access request with respect to an application is provided. The computing apparatus includes a processor; a memory; and a communication interface coupled to each of the processor and the memory. The processor is configured to: receive, from a user via the communication interface, an access request with respect to an application; retrieve, from the memory, group identification information that relates to at least one group to which the user belongs; retrieve, from the memory, scope information that relates to at least one characteristic of a relationship between the user and the at least one group; generate a token that includes a first indicator that relates to the group identification information and at least a second indicator that relates to the scope information, the token being usable to validate the access request; and transmit, to the application via the communication interface, the token in order to facilitate a validation of the access request.

The processor may be hosted on an Active Directory Federation Services (AD FS) server. The memory may include an Active Directory (AD) memory.

The processor may be further configured to retrieve the group identification information by retrieving an object having a name that corresponds to a unique identifier of a relying party thereof.

The group identification information may include information that relates to at least one from among a job title and a job function of the user.

The processor may be further configured to retrieve the scope information by retrieving a link between the relying party and the user. The link may be created in a direction from the user to the relying party.

The scope information may include information that relates to at least one from among a product restriction, a geographical restriction, and an authorization level restriction.

The processor may be further configured to generate the token by retrieving information that identifies the user in conjunction with all existing links between the relying party and the user.

The processor may be further configured to generate the token by extracting, from at least one of the existing links between the relying party and the user, at least one string for which a name of an object that corresponds to the at least one of the existing links matches with the unique identifier of the relying party.

When the application includes a trading application that is usable for executing trades of security instruments, the scope information may include information that relates to at least one restriction for a trade to be executed by the user.

According to yet another exemplary embodiment, a non-transitory computer readable storage medium storing instructions for validating an access request with respect to an application is provided. The storage medium includes executable code which, when executed by a processor, causes the processor to: receive, from a user, an access request with respect to an application; retrieve, from a memory, group identification information that relates to at least one group to which the user belongs; retrieve, from the memory, scope information that relates to at least one characteristic of a relationship between the user and the at least one group; generate a token that includes a first indicator that relates to the group identification information and at least a second indicator that relates to the scope information, the token being usable to validate the access request; and transmit, to the application, the token in order to facilitate a validation of the access request.

The executable code may be further configured to cause the processor to retrieve the group identification information by retrieving an object having a name that corresponds to a unique identifier of a relying party thereof.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
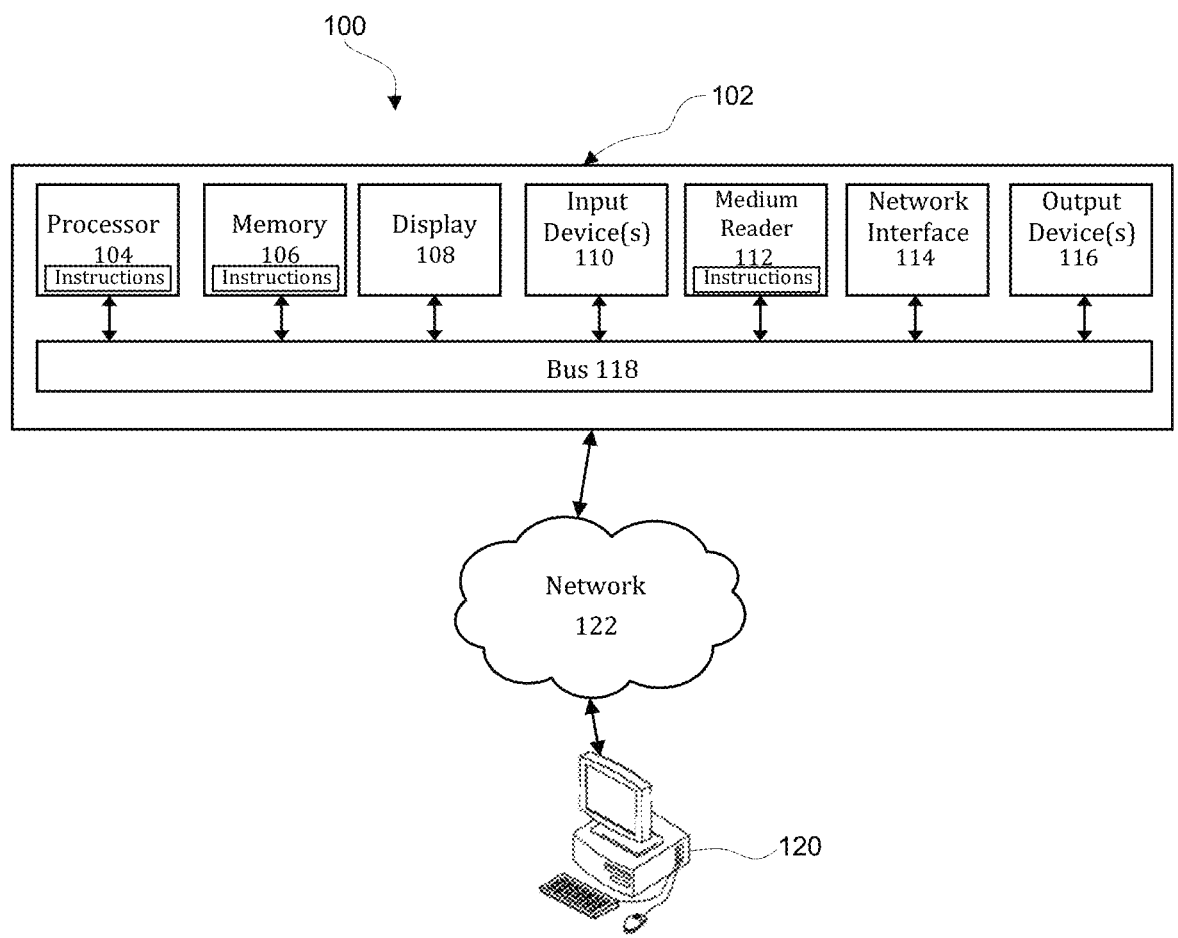
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component.

Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for efficiently validating an application access request and generating an access token while handling large volumes of requests and ensuring accuracy and security with respect to the application.

Figure 2:
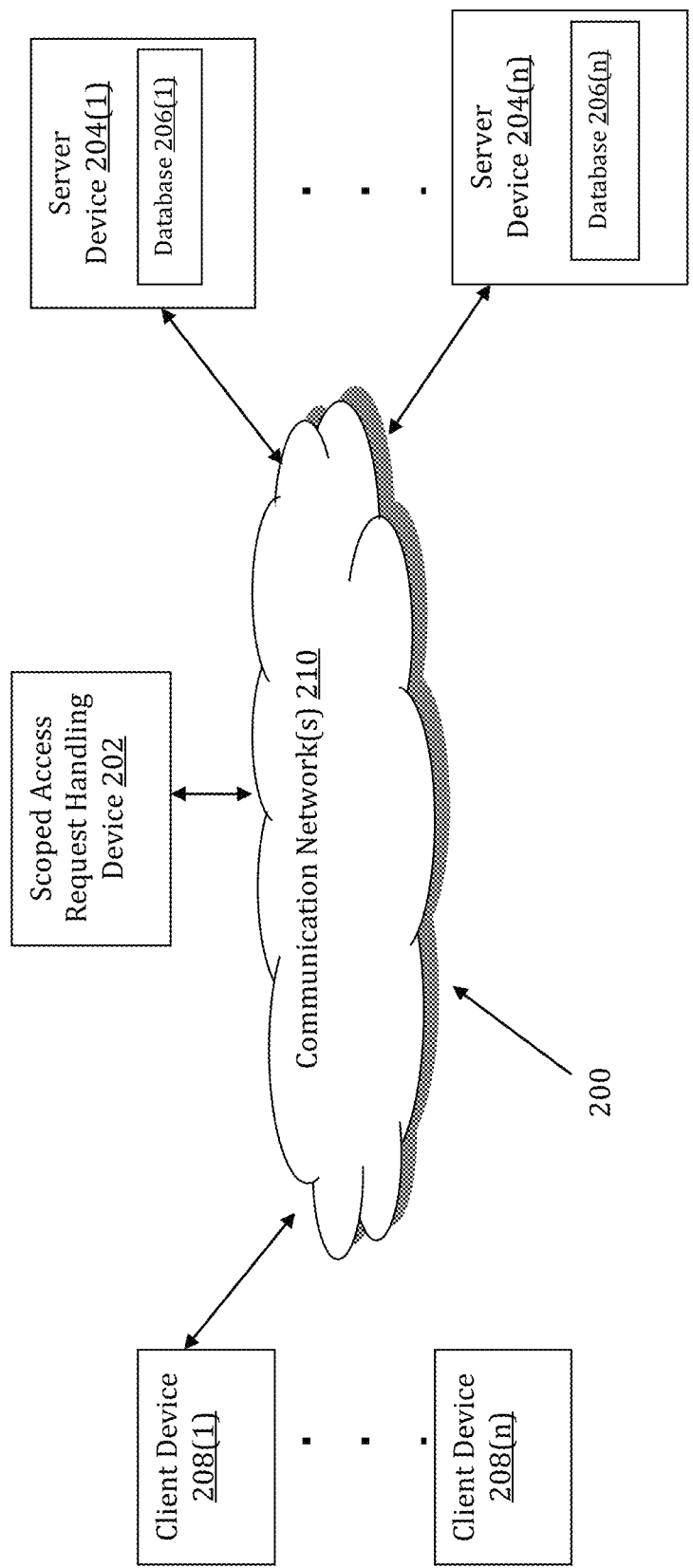
FIG. 2 illustrates an exemplary diagram of a network environment.

Referring to FIG. 2, a schematic of an exemplary network environment 200 for implementing a method for efficiently validating an application access request and generating an access token while handling large volumes of requests and ensuring accuracy and security with respect to the application is illustrated. In an exemplary embodiment, the method is executable on any networked computer platform, such as, for example, a personal computer (PC).

The method for efficiently validating an application access request and generating an access token while handling large volumes of requests and ensuring accuracy and security with respect to the application may be implemented by a Scoped Access Request Handling (SARH) device 202. The SARH device 202 may be the same or similar to the computer system 102 as described with respect to FIG. 1. The SARH device 202 may store one or more applications that can include executable instructions that, when executed by the SARH device 202, cause the SARH device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SARH device 202 itself, may be located in virtual server(s) running in a cloud-based computing environment rather than being tied to one or more specific physical network computing devices. Also, the application(s) may be running in one or more virtual machines (VMs) executing on the SARH device 202. Additionally, in one or more embodiments of this technology, virtual machine(s) running on the SARH device 202 may be managed or supervised by a hypervisor.

In the network environment 200 of FIG. 2, the SARH device 202 is coupled to a plurality of server devices 204(1)-204(n) that hosts a plurality of databases 206(1)-206(n), and also to a plurality of client devices 208(1)-208(n) via communication network(s) 210. A communication interface of the SARH device 202, such as the network interface 114 of the computer system 102 of FIG. 1, operatively couples and communicates between the SARH device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SARH device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SARH devices that efficiently implement a method for efficiently validating an application access request and generating an access token while handling large volumes of requests and ensuring accuracy and security with respect to the application.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SARH device 202 may be a standalone device or integrated with one or more other devices or apparatuses, such as one or more of the server devices 204(1)-204(n), for example. In one particular example, the SARH device 202 may include or be hosted by one of the server devices 204(1)-204(n), and other arrangements are also possible. Moreover, one or more of the devices of the SARH device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SARH device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases 206(1)-206(n) that are configured to store user-specific and group-specific identification data, including identification data that relied upon by an Active Directory Federation Services (AD FS) service provider, and application-specific data that relates to various applications that require security credentials (e.g., tokens) for accessing resources.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SARH device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SARH device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SARH device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SARH device 202, the server devices 204(1)-204(n), or the client devices 208(1)-208(n), for example, may be configured to operate as virtual instances on the same physical machine. In other words, one or more of the SARH device 202, the server devices 204(1)-204(n), or the client devices 208(1)-208(n) may operate on the same physical device rather than as separate devices communicating through communication network(s) 210. Additionally, there may be more or fewer SARH devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
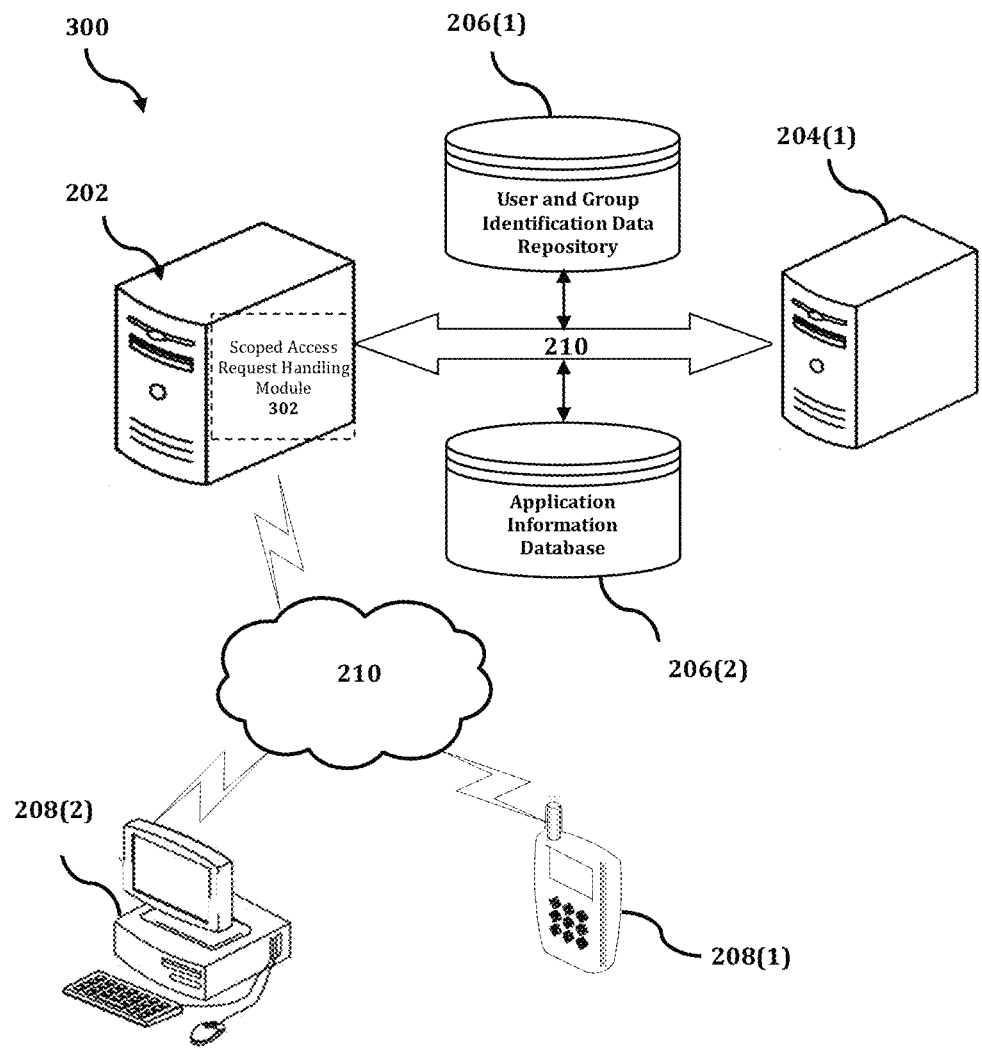
FIG. 3 shows an exemplary system for implementing a method for efficiently validating an application access request and generating an access token while handling large volumes of requests and ensuring accuracy and security with respect to the application.

The SARH device 202 is described and shown in FIG. 3 as including a scoped access request handling module 302, although it may include other rules, policies, modules, databases, or applications, for example. As will be described below, the scoped access request handling module 302 is configured to implement a method for validating an application access request and generating an access token while handling large volumes of requests and ensuring accuracy and security with respect to the application in an automated, efficient, scalable, and reliable manner.

An exemplary process 300 for implementing a method for efficiently validating an application access request and generating an access token while handling large volumes of requests and ensuring accuracy and security with respect to the application by utilizing the network environment of FIG. 2 is shown as being executed in FIG. 3. Specifically, a first client device 208(1) and a second client device 208(2) are illustrated as being in communication with SARH device 202. In this regard, the first client device 208(1) and the second client device 208(2) may be "clients" of the SARH device 202 and are described herein as such. Nevertheless, it is to be known and understood that the first client device 208(1) and/or the second client device 208(2) need not necessarily be "clients" of the SARH device 202, or any entity described in association therewith herein. Any additional or alternative relationship may exist between either or both of the first client device 208(1) and the second client device 208(2) and the SARH device 202, or no relationship may exist.

Further, SARH device 202 is illustrated as being able to access a user and group identification data repository 206(1) and an application information database 206(2). The scoped access request handling module 302 may be configured to access these databases for implementing a method for efficiently validating an application access request and generating an access token while handling large volumes of requests and ensuring accuracy and security with respect to the application.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SARH device 202 via broadband or cellular communication. Of course, these embodiments are merely exemplary and are not limiting or exhaustive.

Upon being started, the scoped access request handling module 302 executes a process to validate an application access request and generate an access token for the application. In an exemplary embodiment, the scoped access request handling module 302 is operating conjunction with an identity provider (IDP) and/or a security token service (STS) in accordance with industry standards for access authorizations, such as the Lightweight Directory Access Protocol (LDAP), the OAuth2 industry standard protocol for authorization, and/or the Security Assertion Markup Language 2.0 (SAML2). An exemplary process for efficiently validating an application access request and generating an access token while handling large volumes of requests and ensuring accuracy and security with respect to the application is generally indicated at flowchart 400 in FIG. 4.

Figure 4:
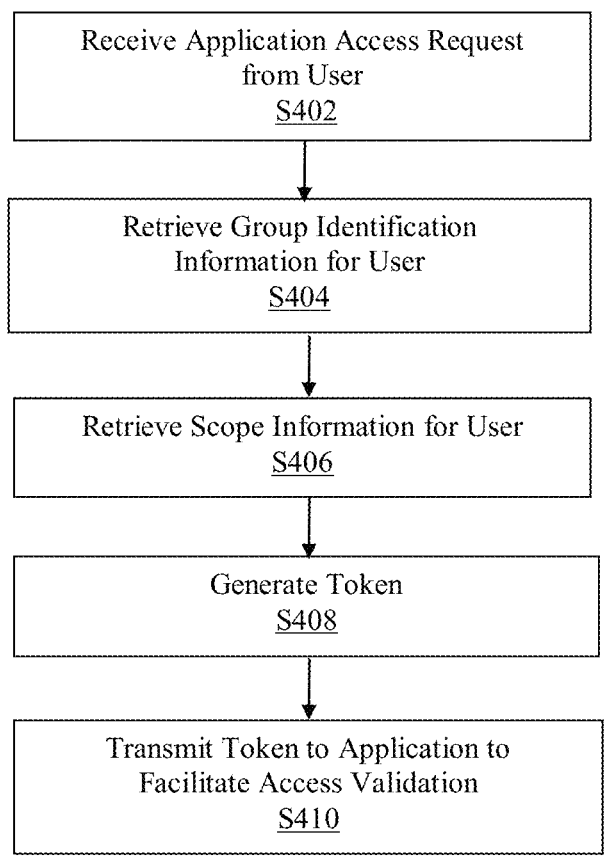
FIG. 4 is a flowchart of an exemplary process for implementing a method for efficiently validating an application access request and generating an access token while handling large volumes of requests and ensuring accuracy and security with respect to the application.

In the process 400 of FIG. 4, at step S402, the scoped access request handling module 302 receives, from a user, an access request for accessing an application. In an exemplary embodiment, the scoped access request handling module 302 is operating in conjunction with an identity provider (IDP) and/or a security token service (STS) in accordance with applicable industry standards, such as, for example, in an Active Directory Federation Services (AD FS) environment, which is a product implementation of an IDP. Further, the scoped access request handling module 302 may be receiving and handling a large number of requests. In an exemplary embodiment, for a large corporate organization, the number of applications that are potentially available for access is greater than one thousand (1000), such as, for example, 5000, 7500, 10,000, or 25,000 applications, and the number of users may be greater than one hundred thousand (100,000), i.e., 500,000; 1,000,000; or 5,000,000.

At step S404, the scoped access request handling module 302 retrieves group identification information that relates to the user from a memory. In an exemplary embodiment, the memory is in compliance with industry standards for directory services, such as, for example, an Active Directory (AD) memory, which is a product implementation of an industry standard LDAP directory service, and the user is a member of a group that pertains to a job title and/or a job function of the user.

At step S406, the scoped access request handling module 302 retrieves scope information that relates to a relates to at least one characteristic of a relationship between the user and the at least one group. In an exemplary embodiment, the scope information may include information that relates to a product restriction, a geographical restriction, and/or an authorization level restriction. For example, when the application is a trading application that is usable for executing trades of security instruments, and the user is a trader that belongs to a group of "traders", the scope information may include information that relates to restrictions for trades to be executed by the user, such as, for example, restrictions that relate to which types of market sectors, commodities, or product sectors may be traded; restrictions that relate to North America or some other geographical area that pertains to a trade; and restrictions that relate to which clients may be trade participants or to maximum dollar amounts for trades.

In step S408, the scoped access request handling module 302 generates a token that is usable by the application for validating the user access request. In an exemplary embodiment, the token includes a first indicator that relates to the group identification information and a second indicator that relates to the scope information, thereby enabling the application to effectively be notified of both types of information upon receipt of the token. Then, in step S410, the scoped access request handling module 302 transmits the token to the application in order to facilitate a validation of the access request.

Figure 5:
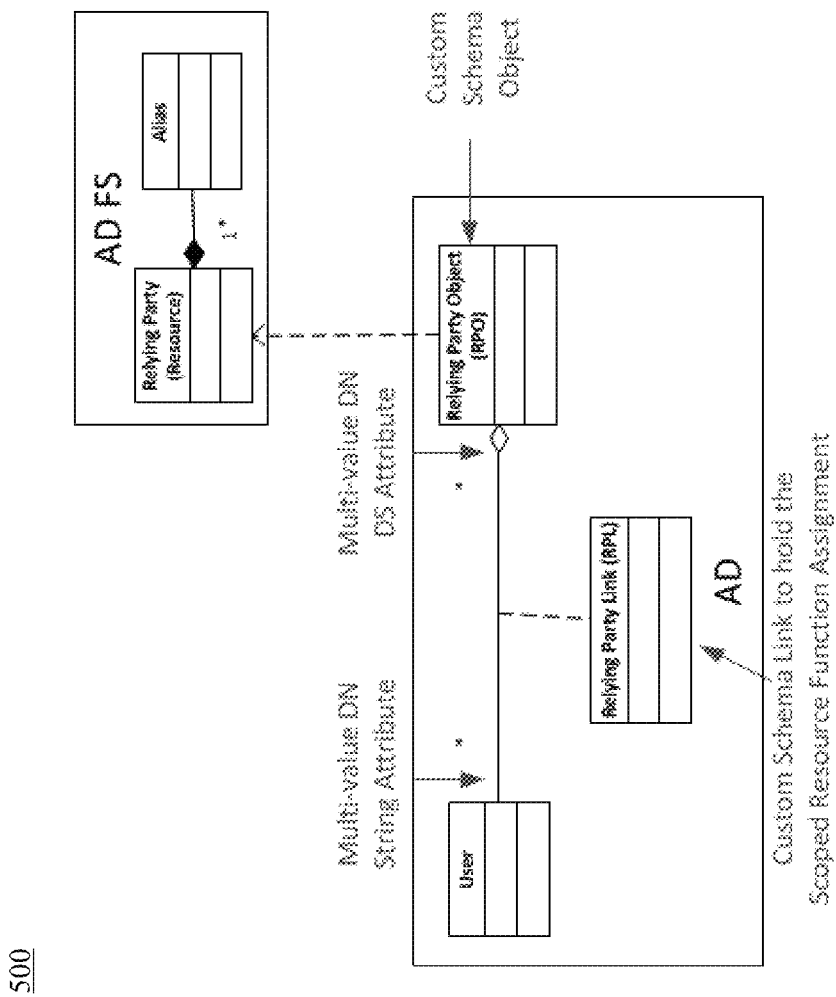
FIG. 5 is a block diagram that illustrates a mechanism for generating a scoped resource function assignment that is to be utilized in an execution of a method for efficiently validating an application access request and generating an access token while handling large volumes of requests and ensuring accuracy and security with respect to the application, in accordance with an exemplary embodiment.

FIG. 5 is a block diagram 500 that illustrates a mechanism for generating a scoped resource function assignment that is to be utilized in an execution of a method for efficiently validating an application access request and generating an access token while handling large volumes of requests and ensuring accuracy and security with respect to the application, in accordance with an exemplary embodiment.

Referring to FIG. 5, for each Relying Party, a single object is created in the directory service memory, such as, for example, AD; this object is referred to as a Relying Party Object (RPO). The RPO is named with the unique identifier of the Relying Party, which is an integer. In an exemplary embodiment, when operating based on an AD FS implementation, the RPO name may be translated through the AD FS alias to a Uniform Resource Indicator (URI) which will be a more familiar name for the application.

For each Scoped Resource Function Assignment to which the User has been assigned, a link is then created between the User and the Relying Party, and each link is referred to as a Relying Party Link (RPL). It is noted that a direction in which these links are created is opposite in comparison to the links used to store non-scoped Roles (Resource Functions) which run from the Group to the User.

In general, Objects in directory services such as Active Directory have a string attribute known as a Common Name (CN) whose length is bounded at 64 double-byte characters. The CN of an Object is unique among the sibling objects in the container that contains the Object, and forms the leftmost part of a Distinguished Name (DN) which uniquely identifies the Object. Most links in AD, including the existing member/memberOf pair used to store non-scoped Roles (i.e., Resource Functions) are formed of attributes of type Object(DS-DN), which indicates that the attribute on each side contains only the DN of the object on the other side.

However, in the Relying Party Link, the User side of the link is stored in multiple values of a special kind of Active Directory attribute type called an Object (DN String) which contains a string value in addition to the DN. The additional string and the DN are written on the Forward Link, and the DN part is maintained (but cannot be read) on the Backward Link.

This string is used to store the entire Scoped Resource Function Assignment on the Relying Party Link in the form of a string that contains both the name of the Resource Function and the scoping information. For example, a possible structure for this string might be "Trader(item,client, branch) [EQU,Corp,NAMR]" to represent the fact that a user has been assigned the trader Resource Function for Equities to Corporate Clients in North America. These strings are pulled into the claim by AD FS.

The Relying Party Object still inherits from the native AD Object known as Distribution Group. This means that existing audit functions that assume they are dealing with AD Groups will monitor changes to Resource Function Assignments. There are slight changes required to deal with the Object (DN String).

In an exemplary embodiment, this approach generates significantly fewer groups than a conventional used of Roles (i.e., Resource Functions), because only one group per Relying Party is created (i.e., one per application, or in a worst case, one per application instance for development, user acceptance testing, production, etc.) It is possible to have multiple Relying Party Links between a User and a Relying Party Object (i.e., multiple Scoped Assignments per User to the same Resource Function, or to different Resource Functions on the same Relying Party), and the RPO/RPL approach co-exists with the existing non-scoped Roles (Resource Functions) in the same AD schema, and AD FS instance.

In order to prepare a token for a User containing Scoped Resource Function Assignments for a Relying Party (or its alias), ADFS issues LDAP queries to AD to perform the following functions:
  retrieve the user along with all the Relying Party Links linked to the User
  write into the token the strings that are stored on the Relying Party Links where the name of the linked Relying Party Object matches the identifier of the Relying Party for which the token has been requested.

This process is extremely fast, as it simply involves a single call to AD to retrieve the User and all its Relying Party Links and a relatively small amount of processing to retrieve the String which is to be written into the claim.

Further, it may be possible to retrieve from AD only the specific links that relate to the Relying Party, by pushing down the filtering of Relying Party Links into the query that is issued against AD. This would mean the number of links retrieved was much lower, and thereby reduce string processing overhead.

The scoped and non-scoped resource functions may be processed into separate claims. Alternatively, the scoped and non-scoped resource functions may be processed into the same claim.

Accordingly, with this technology, an optimized process for implementing methods and systems for efficiently validating an application access request and generating an access token while handling large volumes of requests and ensuring accuracy and security with respect to the application are provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for validating an access request with respect to an application, the method being implemented by at least one processor, the method comprising:
   receiving, from a user, an access request with respect to an application;
   generating, by the at least one processor, a relying party object (RPO) for the application in an active directory (AD) memory;
   retrieving, by the at least one processor from a memory, group identification information that relates to at least one group to which the user belongs;
   analyzing, by the at least one processor, the group identification information to determine a group identity for each of the at least one group and scope information for each of the at least one group, wherein the scope information relates to at least one characteristic of a relationship between the user and the at least one group;
   generating, by the at least one processor, at least one string of characters associated with the user, wherein each at least one string includes the group identity of at least one of the at least one group to which the user belongs and at least one identity of the scope information;
   determining, by the at least one processor for each of the at least one string, whether the string matches an identity of the application;
   generating, by the at least one processor, a relying party link between the user and the application for each string that matches the identity of the application, wherein the relying party link contains the RPO;
   generating, by the at least one processor, a token that includes each string having the relying party link, the token being usable to validate the access request; and
   transmitting, to the application, the token in order to facilitate a validation of the access request.

2. The method of claim 1, wherein the at least one processor includes a processor that is hosted on an Active Directory Federation Services (AD FS) server, and the memory includes the AD memory.

3. The method of claim 1, wherein the group identification information includes information that relates to at least one from among a job title and a job function of the user.

4. The method of claim 1, wherein the retrieving of the scope information comprises retrieving the relying party link, wherein the relying party link is created in a direction from the user to the application.

5. The method of claim 4, wherein the scope information includes information that relates to at least one from among a product restriction, a geographical restriction, and an authorization level restriction.

6. The method of claim 4, wherein the generating of the token comprises retrieving information that identifies the user in conjunction with all existing links between the application and the user.

7. The method of claim 1, wherein when the application includes a trading application that is usable for executing trades of security instruments, the scope information includes information that relates to at least one restriction for a trade to be executed by the user.

8. The method of claim 1, further comprising:
   creating a link between the user and the application for each scope information for each at least one group to which the user belongs.

9. The method of claim 1, further comprising:
   translating, by the at least one processor via the AD, the RPO to a uniform resource indicator (URI).

10. A computing apparatus for validating an access request with respect to an application, the computing apparatus comprising:
   a processor;
   a memory; and
   a communication interface coupled to each of the processor and the memory,
   wherein the processor is configured to:

receive, from a user via the communication interface, an access request with respect to an application;

generate a relying party object (RPO) for the application in an active directory (AD) memory;

retrieve, from the memory, group identification information that relates to at least one group to which the user belongs;

analyze the group identification information to determine a group identity for each of the at least one group and scope information for each of the at least one group, wherein the scope information relates to at least one characteristic of a relationship between the user and the at least one group;

generate at least one string of characters associated with the user, wherein each at least one string includes the group identity of at least one of the at least one group to which the user belongs and at least one identity of the scope information;

determine, for each of the at least one string, whether the string matches an identity of the application;

generate a relying party link between the user and the application for each string that matches the identity of the application, wherein the relying party link contains the RPO;

generate a token that includes each string having the relying party link, the token being usable to validate the access request; and transmit, to the application via the communication interface, the token in order to facilitate a validation of the access request.

11. The computing apparatus of claim 10, wherein the processor is hosted on an Active Directory Federation Services (AD FS) server, and the memory includes the AD memory.

12. The computing apparatus of claim 10, wherein the group identification information includes information that relates to at least one from among a job title and a job function of the user.

13. The computing apparatus of claim 10, wherein the processor is further configured to retrieve the scope information by retrieving the relying party link, wherein the relying party link is created in a direction from the user to the application.

14. The computing apparatus of claim 13 wherein the scope information includes information that relates to at least one from among a product restriction, a geographical restriction, and an authorization level restriction.

15. The computing apparatus of claim 13, wherein the processor is further configured to generate the token by retrieving information that identifies the user in conjunction with all existing links between the application and the user.

16. The computing apparatus of claim 10, wherein when the application includes a trading application that is usable for executing trades of security instruments, the scope information includes information that relates to at least one restriction for a trade to be executed by the user.

17. The computing apparatus of claim 10, further comprising:
creating a link between the user and the application for each scope information for each at least one group to which the user belongs.

18. The computing apparatus of claim 10, further comprising:
translate, via the AD, the RPO to a uniform resource indicator (URI).

19. A non-transitory computer readable storage medium storing instructions for validating an access request with respect to an application, the storage medium comprising executable code which, when executed by a processor, causes the processor to:

receive, from a user, an access request with respect to an application;

generate a relying party object (RPO) for the application in an active directory (AD) memory;

retrieve, from a memory, group identification information that relates to at least one group to which the user belongs;

analyze the group identification information to determine a group identity for each of the at least one group and scope information for each of the at least one group, wherein the scope information relates to at least one characteristic of a relationship between the user and the at least one group;

generate at least one string of characters associated with the user, wherein each at least one string includes the group identity of at least one of the at least one group to which the user belongs and at least one identity of the scope information;

determine, for each of the at least one string, whether the string matches an identity of the application;

generate a relying party link between the user and the application for each string that matches the identity of the application, wherein the relying party link contains the RPO;

generate a token that includes each string having the relying party link, the token being usable to validate the access request; and transmit, to the application, the token in order to facilitate a validation of the access request.

* * * * *